United States Patent [19]

Matoba et al.

[11] Patent Number: 4,789,568

[45] Date of Patent: Dec. 6, 1988

[54] COATING COMPOSITION

[75] Inventors: Takao Matoba; Osamu Iwase; Tuguo Nezu; Shinji Sugiura, all of Hiratsuka, Japan

[73] Assignee: Kansai Paint Co., Ltd., a Japanese Corp., Hyogo, Japan

[21] Appl. No.: 37,782

[22] Filed: Apr. 13, 1987

[30] Foreign Application Priority Data

Apr. 18, 1986 [JP] Japan .................................. 61-89821

[51] Int. Cl.$^4$ .......................... C08L 51/00; B32B 9/04; C03F 265/04
[52] U.S. Cl. ............................... 427/412.1; 427/412.3; 524/504; 525/285
[58] Field of Search ........................ 525/285; 524/504; 427/412.1, 412.3

[56] References Cited

U.S. PATENT DOCUMENTS

| 3,448,089 | 6/1969 | Celeste .............................. | 525/285 |
| 3,448,174 | 6/1969 | Loveless et al. ..................... | 525/285 |
| 3,453,246 | 7/1969 | Heilman .............................. | 525/285 |
| 3,617,351 | 11/1971 | Long et al. ......................... | 524/504 |
| 3,707,516 | 12/1972 | Walvs ................................ | 524/504 |
| 4,313,859 | 2/1982 | Gardner ............................. | 525/285 |

FOREIGN PATENT DOCUMENTS

| 0074811 | 3/1983 | European Pat. Off. ............ | 525/285 |
| 0019863 | 8/1969 | Japan ................................ | 525/285 |
| 0196209 | 11/1983 | Japan ................................ | 525/285 |
| 1066873 | 4/1967 | United Kingdom ................. | 525/285 |

Primary Examiner—Herbert J. Lilling
Attorney, Agent, or Firm—Wenderoth, Lind & Ponack

[57] ABSTRACT

An organic solvent-type coating composition comprising as a main film-forming component a modified polyolefin composed of an adduct of a monoepoxy compound with an polyolefin having maleic acid or its anhydride grafted thereto, and a method of coating a plastic material using the coating composition.

15 Claims, No Drawings

COATING COMPOSITION

This invention relates to a coating composition. More specifically, it relates to a coating composition suitably used as a "primer" between a material to be coated, especially a plastic material, and a coated film of a sealer or a top coating paint, and to a method of coating a plastic material using the coating composition.

In recent years, plastics, for example polyolefin resins such a polyethylene and polypropylene, acrylonitrile/-butadiene/styrene copolymer (ABS resin), polycarbonate resins, polyamide resins, fiber-reinforced plastics (FRP), polyurethane resins and polyphenylene oxide resins, have frequently been used to manufacture part or the whole of such a product as the exterior plates of automobiles, electrical appliances, office machines and furniture for various reasons including the reduction of weight, the curtailment of the cost, the ease of fabrication and the increase of safety and hygiene. In many cases, these plastic materials are coated with paints for aesthetic and protective purposes.

In the prior art, the surface of a plastic material is pre-treated by acid etching, electron beam irradiation, corona discharge, etc. prior to coating. In particular, nonpolar plastic materials such as polyolefin resins have poor adhesion with respect to paint films, and the paint films applied thereto have insufficient chipping resistance, impact resistance, bending resistance, water resistance and gasoline resistance. The "chipping" denotes a phenomenon in which a coated film peels locally from a surface on which it is formed, or from between other coated film layers, owing to an energy of impact generated when pebbles, gravel, etc. collide with its surface. This phenomenon occurs frequently when pebbles, etc. kicked off by automobile wheels collide with the coated surface of the exterior plate of a running automobile. Chipping markedly reduces the appearance of the coated article, and if the coated article is made of metal, rust easily forms at that part in which chipping has occurred.

To remove this defect, it was proposed to use a pre-treating agent (primer) composed mainly of chlorinated polypropylene or ethylene/propylene copolymer having maleic acid grafted thereto to pre-treat such plastic materials (Japanese Laid-Open Patent Publications Nos. 48260/1980 and 36128/1982). A film of this pre-treating agent has good adhesion to a plastic material. A film of a sealer or a top coating paint applied to the film of the pre-treating agent has relatively good chipping resistance, impact resistance, bending resistance, water resistance and gasoline resistance. However, the adhesion between the film of the pre-treating agent and the film of the sealer or top coating paint is not sufficient at low temperatures. Furthermore, the dispersibility of a pigment in the pre-treating agent is inferior, and when the pigment is incorporated in the pre-treating agent, the pre-treating agent has the defect of being susceptible to thickening, flocculation and sedimentation during storage. The reduction of its storage stability occurs particularly remarkably when an inorganic electrically conductive fine powder with an average particle diameter of not more than 0.5 micron is incorporated into the pre-treating agent.

It is an object of this invention to provide a coating composition which is free from the aforesaid defects and is particularly suitable for coating plastic materials.

Another object of this invention is to produce a coating composition which is useful as a plastic pre-treating agent (primer) useful for increasing the adhesion of a plastic material to a coated film of a sealer or a top coating paint and improving the properties, such as chipping resistance, water resistance, gasoline resistance, impact resitance and bending resistance, of the sealer or top coat film.

Still another object of this invention is to develop a pre-treating agent which permits good dispersion of a pigment and is substantially free from pigment sedimentation, pigment flocculation, and thickening during storage.

Other objects and features of the present invention will become apparent from the following detailed description.

According to this invention, there is provided an organic solvent-type coating composition comprising as a main film-forming component a modified polyolefin composed of an adduct of a monoepoxy compound with a polyolefin having maleic acid or its anhydride grafted thereto.

In the present specification and the appended claims, the term "organic solvent-type coating composition" denotes a composition obtained by dissolving or dispersing the aforesaid modified polyolefin in an organic solvent.

The modified polyolefin used as a main film-forming component in the coating composition of this invention is a product obtained by graft copolymerizing maleic acid or maleic anhydride with an polyolefin as a base (trunk), and subjecting the graft copolymer to addition reaction with a monoepoxy compound.

Examples of the polyolefin used as a base include homopolymers of olefins, copolymers of two or more olefins with each other, and copolymers of olefins as a major component with one or more other comonomers such as vinyl acetate, acrylic monomers or methacrylic monomers. For example, homo- or co-polymers of at least one ethylenic hydrocarbon of the general formula $C_nH_{2n}$ where n is suitably an integer of 2 to 12, such as ethylene, propylene, butene, isobutylene, pentene, hexene, heptene, octene and decene, are conveniently used. These polyolefins may have a number average molecular weight of generally 10,000 to 500,000, preferably 30,000 to 300,000, and desirably have a glass transition temperature of generally not more than 0° C., preferably not more than −30° C.

Advantageously, ethylene/propylene copolymers composed of 10 to 60 mole% of ethylene units and 90 to 40 mole% of propylene units, preferably 25 to 50 mole% of ethylene units and 75 to 50 mole% of propylene units. These ethylene/propylene copolymers desirably have a glass transition temperature of not more than −10° C., especially not more than −30° C. Furthermore, these ethylene/propylene copolymers conveniently have a number average molecular weight in the range of 10,000 to 500,000, preferably 30,000 to 300,000.

Grafting of maleic acid or maleic anhydride to the polyolefin can be carried out by a graft polymerization method known per se. For example, it can be carried out easily by heating the polyolefin and maleic acid and/or maleic anhydride with stirring in the presence of a radical initiator. More specifically, maleic acid and/or maleic anhydride and the radical initiator are successively added to a solution or dispersion of the polyolefin in an organic solvent, and the mixture is heated to a temperature above the melting point of the polyolefin, particularly 100° to 160° C.

There is no particular limitation on the radical initiator if it promotes the graft polymerization of maleic acid or maleic anhydride onto the polyolefin. Organic peroxides and organic peresters may be cited as examples. Specific examples include benzoyl peroxide, dichlorobenzoyl peroxide, dicumyl peroxide, di-tert-butyl peroxide, 2,5-dimethyl-2,5-di(peroxybenzoate)hexyne-3,1,4-bis(tert-butylperoxyisopropyl)benzene, lauroyl peroxide, oxide, tert-butyl peracetate, 2,5-dimethyl-2,5-di(tertbutylperoxy)hexyne-3,2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, tert-butylperoxyisobutyrate, tert-butylperoxyoctate, cumyl perpivalate and tert-butylperdiethylacetate. Other azo compounds such as azobisisobutyronitrile and dimethyl azoisobutyrate may also be used. Preferred among these radical initiators are dialkyl peroxides such as dicumyl peroxide, di-tertbutyl peroxide, 2,5-dimethyl-2,5-di(tert-butylperoxy)hexyne-3,2,5-dimethyl-2,5-di(tert-butylperoxy)hexane and 1,4-bis(tert-butylperoxyisopropyl)-benzene.

There is no particular restriction on the amount of the radical initiator. Preferably, it is used in such an amount that the mole ratio of the radical initiator to maleic acid and/or maleic anhydride is generally from 1:100 to 3:5, preferably from 1:20 to 1:2.

Examples of the organic solvent in which to dissolve or disperse the polyolefin include aromatic hydrocarbons such as benzene, toluene and xylene; aliphatic hydrocarbons such as hexane, heptane, octane and decane; and chlorinated hydrocarbons such as trichloroethylene, perchloroethylene, dichloroethane, dichloroethylene and chlorobenzene. Of these, aromatic hydrocarbons, particularly, alkyl-substituted aromatic hydrocarbons are preferred.

Advantageously, the total content of maleic acid and/or maleic anhydride in the resulting graft polymer is generally 1 to 25% by weight, preferably 3 to 20% by weight, more preferably 5 to 15% by weight, based on the polyolefin as a base.

Thereafter, addition-reaction of a monoepoxy compound with the graft polymer is carried out to obtain the modified polyolefin used in this invention.

In the addition reaction between the graft polymer and the monoepoxy compound, the graft polymer obtained by graft polymerization of the polyolefin with maleic acid is directly submitted to the addition reaction with the monoepoxy compound. However, the graft polymer obtained by graft polymerization of the polyolefin with maleic anhydride is preferably reacted with the monoepoxy compound after the acid anhydride group of the graft polymer is ring-opened with a monohydroxy compound.

The monoepoxy compound to be reacted with the graft polyolefin having maleic acid and/or ring-opened maleic anhydride grafted thereto includes relatively low-molecular-weight (usually with a molecular weight of not more than 1,000) compounds having one epoxy group (including an oxoran ring and a glycidyl group) per molecule. Examples are alpha-alkylene oxides such as ethylene oxide, butylene oxide, propylene oxide, and alpha-alkylene oxides of the formula

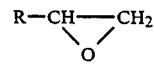

where R represents a linear alkyl group with 6 to 30 carbon atoms; glycidyl ethers such as butyl glycidyl ether and phenyl glycidyl ether; and glycidyl esters such as Cardura E (a tradename for a glycidyl ester of a tertiary fatty acid having the general formula

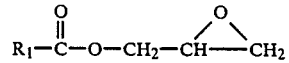

wherein $R_1$ represents a saturated $C_8$–$C_{10}$ aliphatic branched chain hydrocarbon group in which the alpha-carbon is predominantly quaternary, made by Shell Chemical Co.), glycidyl acrylate and glycidyl methacrylate. Of these Cardura E and the alpha-alkylene oxides of the formula

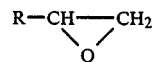

(R is as defined above) are preferred.

The amount of the monoepoxy compound depends upon its type and the amount of maleic acid and/or maleic anhydride grafted, and is not strictly limited. Generally, the monoepoxy compound is added to the graft polymer in such a proportion that it is included in the additionreaction product in an amount of 1 to 50% by weight, preferably 2 to 30% by weight, more preferably 5 to 20% by weight.

The monohydroxy compound used for ring-opening of the acid anhydride group of maleic acid which can be present in the graft polymer is a compound having one hydroxyl group per molecule. Specific examples include aliphatic alcohols such as methanol, ethanol, isopropanol, n-butanol, t-butanol, n-amyl alcohol, n-hexyl alcohol and 2-ethylhexyl alcohol, alicyclic alcohols such as cyclohexanol and methylcyclohexanol, and etherified alcohols such as ethylene glycol monoethyl ether, ethylene glycol monobutyl ether and diethylene glycol monomethyl ether. Lower aliphatic alcohols such as methanol and ethanol are preferred.

Ring opening of the acid anhydride group using the monohydroxy compound can be easily carried out by mixing the monohydroxy compound with an organic solvent solution or dispersion of the graft polymer having maleic anhydride grafted thereto, and heating the mixture to a temperature of, for example about 60° to about 150° C. with stirring. The amount of the monohydroxy compound used is preferably in a slight excess with respect to one equivalent of the acid anhydride group contained in the graft polymer (for example, in an amount of 1.5 to 5 equivalents) in order to ring-open the acid anhydride group sufficiently.

The addition reaction of the monoepoxy compound with the polymer having a ring-opened anhydride group and/or polymer having maleic acid grafted thereto may be carried out by mixing the monoepoxy compound with an organic solvent solution or dispersion of the graft polyolefin, and heating the mixture to a temperature of about 90° to about 130° C. with stirring, but is not limited to this method alone.

This addition-reaction is effected between the carboxyl group in the graft polyolefin and the epoxy group in the monoepoxy compound. A catalyst is preferably used to promote the addition reaction. Examples of the catalyst are tertiary amines such as triethylamine and tri-n-butylamine, basic compounds such as pyridine, isoquinoline, quinoline, N,N-dimethylaniline and N-(beta-hydroxyethyl)amine, quaternary ammonium salts such as tetraethyl ammonium bromide and tetramethyl ammonium iodide, and protonic acids such as $SnCl_4$, $BF_3$, $AlCl_3$, Lewis acids and HBr. The amount of the catalyst used is preferably 0.1 to 10 parts by weight per 100 parts by weight of the graft polymer and the monoepoxy compound combined.

The modified polyolefin can be formed into the coating composition of the invention by dissolving or dispersing it into an organic solvent. The organic solvent used to dissolve or disperse the modified polyolefin may be the same as those described hereinabove as reaction solvents for the graft polymerization of the polyolefin with maleic acid and/or maleic anhydride. Alcohol solvents such as methanol, ethanol, isopropanol and butanol, ketone solvents such as acetone, methyl ethyl ketone and methyl isobutyl ketone, and esters such as methyl acetate, ethyl acetate, isopropyl acetate and butyl acetate may be used in combination with the aforesaid organic solvent. The mixing proportion is such that the amount of the former organic solvent is 20 to 100% by weight based on the total amount of the two solvents.

As required, the coating composition of this invention may contain one or more additives such as pigments, electrically conductive powders, pigment dispersing agents, plasticizers, surface-active agents, antisagging agents, film surface regulating agents and weatherability improvers.

The incorporation of a pigment in the coating composition of this invention is effective for increasing the adhesion and smoothness of a coated film of the coating composition to a plastic material or to a coated film of a sealer or top coat paint. Colored pigments, anti-corrosive pigments, extender pigments, metallic pigments, etc. which are incorporated in usual paints may be used as the pigment. Specific preferred examples include colored pigments such as titanium white and carbon black, anti-corrosive pigments such as zinc powder, lead sub-oxide, lead chromate and zinc chromate, extender pigments such as asbestos, talc and clay, and metallic pigments such as aluminum powder and micaceous iron oxide. The suitable amount of the pigment is generally not more than 100 parts by weight, preferably 0 to 50 parts by weight, per 100 parts by weight of the modified polyolefin.

The electrically conductive powder is effective for permitting easy application of a sealer or a top coat paint by an electrostatic coating on a plastic material on which the coating composition of the invention has been coated. Examples of the conductive powder are electrically conductive carbon powders such as furnace black and channel black, electrically conductive metal powders such as nickel, aluminum, silver and copper, and semiconductor powders such as zinc oxide, tin oxide, tungsten oxide and nickel-coated mica. The amount of the electrically conductive powder is not critical and can be varied widely according to its type, etc. Usually, the preferred amount is not more than 100 parts by weight, especially 10 to 50 parts by weight, per 100 parts by weight of the modified polyolefin. In order to permit electrostatic coating of a sealer or a top coating paint, the coating composition of the invention is preferably adjusted by, for example, properly selecting the type or amount of the conductive powder so that the coated film of the coating composition of the invention applied to the plastic material has a volume inherent resistivity of not more than $10^7$ ohms-cm, especially not more than $10^5$ ohms-cm.

Since the modified polyolefin in the coating composition of the invention permits good dispersion of the pigments or conductive powders therein and has excellent storage stability, the pigment or the conductive powder can be directly mixed with, or dispersed in, the modified olefinic resin. Furthermore, since the modified polyolefin has good compatibility with other paint resins, it is possible to knead the pigment and/or conductive powder first with another paint resin (such as an alkyd resin, a polyester resin, an acrylic resin, an epoxy resin, an amino resin, or a silicone resin) as a pigment dispersing agent, and mix or disperse the mixture with or in the modified polyolefin.

The amount of the pigment dispersing agent is generally not more than 30 parts by weight, preferably 5 to 20 parts by weight, per 100 parts by weight of the modified polyolefin.

Plasticizers, surface-active agents, antisagging agents, film surface regulating agents and weatherability improvers may be included, as required, in amounts which are normally used.

The coating composition of this invention may be prepared by mixing or dispersing the above ingredients by using a ball mill, a roll, an attriter, a dissolver, etc.

Objects to be coated by using the coating composition of this invention are not limited to plastic materials, and it may be applied to objects of other materials. For example, it may be coated directly to an object composed of metal, glass, wood or inorganic materials, or the surface of a primer or a sealer applied to the object to improve adhesion to another coated film.

The method of coating the coating composition of this invention is not particularly restricted, for example by spray coating, electrostatic coating, dip coating, curtain flow coater, flow coating, brush coating, etc. There is no particular restriction on the thickness of the coated film, but usually, it is preferably 3 to 50 microns. Drying of the coated film may be effected by leaving it to stand at room temperature or by heating. The heating temperature may be any temperature below the lowest temperature at which the substrate, the coated surface and the coating composition of this invention are deformed or degraded.

The coating composition of this invention can be especially conveniently used as a pre-treating agent (primer) for plastic materials. The method of coating plastic materials with the coating composition of this invention will be further described below.

The coating composition of this invention may be applied to any of various plastic materials such as polyolefin resins (e.g., polyethylene or polypropylene), acrylonitrile/butadiene/styrene copolymer (ABS resin), polycarbonate, polyamide resins, fiber-reinforced plastics (FRP), polyurethane resins and polyphenylene oxide resin which have recently used to manufacture part or the whole of such a product as the exterior plates of automobiles, electrical appliances, office machines and furniture. The plastic materials may be in any of various forms such as a film, a sheet or another molded article.

Preferably, a mold releasing agent, dirt and dust present on the surface of the plastic material are desirably removed before the coating of the coating composition of this invention.

The composition of this invention is coated on the surface of the plastic material by any suitable method such as those mentioned hereinabove. The preferred thickness of the coated film is generally 3 to 50 microns, preferably 5 to 30 microns, as the dry thickness. The drying temperature for the coated film may be below the heat distortion temperature of the plastic material, usually a temperature from room temperature to 140° C.

As required, a sealer is coated on the surface of the coated film of the coating composition of this invention on the plastic material. Then, a top coating paint is coated on the primer coat of the invention or the sealer. Prior to the coating of the plastic material with the sealer or top coat, the coated film of the coating composition applied in advance to the plastic material may be dried under the aforesaid conditions. But it is also possible to apply the sealer or top coat without drying the coated film of the composition of this invention.

The sealer and the top coat that can be coated on the plastic material may be any of those known paints. Suitable sealer paints may be amino-alkyd resin type paints, amino-polyester resin type paints, amino/acrylic resin type paints and urethane type paints. Suitable top coating paints may be amino-alkyd resin type paints, amino/polyester resin type paints, amino/acrylic resin type paints and urethane-type paints.

These paints may be coated by methods known per se, for example spray coating, electrostatic coating and dip coating. The preferred thickness of the coated film (dry film) is 10 to 40 microns. Curing of the coated film is effected at room temperature or by heating according to the components of the paints. The top coat may, for example, be a solid color finish by applying a paint containing a colored pigment, or may be a two-coat finish by coating a clear paint after the solid color finishing or the application of a paint containing a metallic pigment. Such coatings may be applied as in the case of the sealer paint, and the suitable thickness of the coated film (dry film) is 10 to 50 microns.

The coating composition can especially conveniently be used as a pre-treating agent (primer) to be coated on a plastic material prior to coating of a sealer or a top coat in order to increase the adhesion between the plastic material and the sealer or the top coat.

Thus, according to this invention, the surface film and the top coat film can be firmly bonded also to those plastic materials which are nonpolar and have a low surface energy and of which adhesion to coated films is difficult to increase in the prior art, such as polyolefin resins, polyester resins, polyamide resins, polyurethane resins, polycarbonate resins, unsaturated polyester resins, ABS resins and polystyrene resins. Since the adhesion of such coated films does not undergo deterioration even at low temperatures (for example, below −30° C.), they can be fully applied to exterior plastic plates of automobiles which may be used in districts of cold climate.

Furthermore, the sealer and top coat films formed on plastic materials coated with the coating composition of this invention have much improved water resistance, gasoline resistance, impact resistance, bending resistance and chipping resistance over those formed on the uncoated plastic material.

The modified polyolefin in the coating composition of this invention permit better dispersion of pigments or conductive powders and has better compatibility with another paint resin (or a pigment dispersing agent) than a polyolefin having maleic acid or maleic anhydride grafted thereto. During storage, thickening, flocculation and sedimentation are hardly observed. Moreover, it can further improve the adhesion of the composition of this invention to plastics and to a sealer or top coat film, the surface smoothness of the coated film of the composition and the applicability of the composition by electrostatic coating. Even when an electrically conductive powder having an average particle diameter of not more than 0.5 micron is incorporated in the composition of this invention, it has excellent storage stability.

As stated above, a marked technical effect can be obtained by applying the coating composition of the invention to plastic materials. It can also be applied directly as a pre-coating treating agent to other materials such as metal, glass, wood, paper, inorganic materials. Moreover, it can be applied to the surface of a primer or sealer film applied to such other materials. In either case, the same technical effect as described above can be obtained.

The following Examples and Comparative Examples illustrate the present invention. All parts and percentages in these examples are by weight unless otherwise specified.

1.

Examples of production of graft polymers having maleic acid and/or maleic anhydride grafted thereto Toluene was added to an ethylene/propylene copolymer, and the mixture was heated to about 145° C. in a nitrogen atmosphere to dissolve the copolymer. Then, with stirring, di-tert-butyl peroxide and maleic acid and/or maleic anhydride were gradually added dropwise to perform graft polymerization reaction at the above temperature. The reaction mixture was cooled and put in a large amount of acetone to precipitate the graft polymer. It was washed with acetone, dried and then dissolved in toluene.

The composition of the graft copolymer was as shown in Table 1.

TABLE 1

| Graft polymer | (i) | (ii) | (iii) | (iv) | (v) |
|---|---|---|---|---|---|
| Mole ratio of ethylene to propylene (mole %) | 28/72 | 32/68 | 37/63 | 42/58 | 47/53 |
| Maleic acid content (%) | 0 | 0 | 0 | 0 | 4 |
| Maleic anhydride content (%) | 18 | 15 | 13 | 10 | 3 |
| Solvent | | | Toluene | | |
| Solids content (%) | | | 10 | | |

2.

Examples of production of modified polyolefin

In each run, the graft polymer solution produced in 1 above was mixed with methanol and tri-n-butylamine, and the mixture was heated at 110° C. for 1 hour to ring-open the acid anhydride group. Then, Cardura E was added, and the mixture was heated at the same temperature for about 3 hours to give a modified polyolefin.

The amounts of the components used and the content of the monoepoxy compound (Cardura E) in the modified polyolefin are shown in Table 2.

TABLE 2 tained by similarly kneading and dispersing a mixture of titanium white (JR-602) and coconut oil-modified short-oil alkyd resin in a weight ratio of 7.5:1 (as solids). As paints for Comparative Examples, the graft polymer solutions (not subjected to addition-reaction with the monoepoxy compound) obtained in accordance with Table 1 were used.

TABLE 3

| | | Example | | | | | | | | | | | Comparative Example | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 |
| Designation | | A | B | C | D | E | F | G | H | I | J | K | L | M | N | O | P |
| Modified polyolefin (*) | Designation | I | II | III | IV | V | I | III | V | I | III | V | | | | | |
| | Amount (parts) | 100 | 100 | 100 | 100 | 100 | 100 | 100 | 100 | 100 | 100 | 100 | | | | | |
| Electrically conductive paste | | 32 | 32 | 32 | 32 | 32 | 32 | 32 | 32 | | | | 32 | 32 | 32 | | |
| Titanium white paste | | 68 | 68 | 68 | 68 | 68 | | | | | | | 68 | 68 | 68 | | |
| Other component | Designation | | | | | | | | | | | | (i) | (ii) | (iii) | (iv) | (v) |
| | Amount (parts) | | | | | | | | | | | | 100 | 100 | 100 | 100 | 100 |

(*) The modified polyolefin was used in the form of a toluene solution (solids content 10%).

| Modified olefinic resin | | I | II | III | IV | V |
|---|---|---|---|---|---|---|
| Graft polymer solution | Designation | (i) | (ii) | (iii) | (iv) | (v) |
| | Amount (parts) | 1000 | 1000 | 1000 | 1000 | 1000 |
| Methanol | | 20 | 18 | 15 | 13 | 4 |
| Tri-n-butylamine | | 10 | 9 | 8 | 7 | 6 |
| Cardura E | | 23 | 18 | 14 | 10 | 10 |
| Content of Cardura E (%) | | 18 | 15 | 12 | 9 | 7 |
| Solids content (%) | | 10 | 10 | 10 | 10 | 10 |

3.

Examples and Comparative Examples

Coating compositions in accordance with this invention were produced by using the modified polyolefins obtained in 2 above. The components and their amounts (as the weights of solids) are shown in Table 3.

In Table 3, the electrically conductive paste was prepared by kneading and dispersing a mixture composed of Printex L-6 (electrically conductive carbon black having an average particle diameter of 0.04 micron) made by Degussa Company, West Germany)/titanium white JR-602 (a tradename for a product of Teikoku Kako Co., Ltd.)/coconut oil-modified short-oil alkyd resin in a weight ratio (as solids) of 2/1/1 by an attriter. The titanium white paste in Table 3 was ob- The resulting coating compositions were coated on plastic and other materials in accordance with the coating steps shown in Table 4, and the properties of the coated films were tested.

(1) Preparation of substrates to be coated (a): An automobile bumper made of polypropylene was cut into a size of 10×5×1 cm, and its surface was degreased with a vapor of trichloroethylene.

(b): A cationic electrodeposition paint comprising a polyamide-modified bisphenol-type epoxy resin and a blocked polyisocyanate compound as vehicle components was electrodeposited in a customary manner on a steel sheet (10×5×0.8 cm in size), and heated at 160° C. for 30 minutes to cure the coated film (thickness 20 microns).

(c): AMILAC N-2 Sealer (a tradename for a sealer made by Kansai Paint Co., Ltd.) was coated on the coated plate prepared in (b) above and heated at 140° C. for 20 minutes to cure the coated film (Film thickness 20 microns).

(2) Sealer (A): AMILAC N-2 Sealer (3) Top coating paint (A): AMILAC White (a tradename for an aminoalkyd resin-type top coating paint made by Kansai Paint Co., Ltd.).

TABLE 4

| | | Example | | | | | | | | | | | | | | | |
|---|---|---|---|---|---|---|---|---|---|---|---|---|---|---|---|---|---|
| | | 12 | 13 | 14 | 15 | 16 | 17 | 18 | 19 | 20 | 21 | 22 | 23 | 24 | 25 | 26 | 27 |
| Object coated | | | | | | | (a) | | | | | | | | (c) | | |
| Coating of the coating composition (*1) | Designation | A | B | C | D | E | F | G | H | I | J | K | C | G | I | J | K |
| | Film thickness | | | | | | | | | 5μ | | | | | | | |
| | Drying | | | | | | | | | 120° C., 20 min. | | | | | | | |
| Sealer coating (*2) | Designation | — | | | | | | | | (A) | | | | | | | |
| | Coating method | — | | | Electrostatic spray | | | | | | | | Air spray | | | | |
| Top coating (*3) | Designation | | | | | | | | | (A) | | | | | | | |
| | Coating method | | | | Electrostatic spray | | | | | | | | Air spray | | | | |
| Properties of the coated film (*4) | | | | | | | | | | | | | | | | | |

TABLE 4-continued

| | | | | | | | | | | | | | | | | | |
|---|---|---|---|---|---|---|---|---|---|---|---|---|---|---|---|---|---|
| Storage stability | | ◎ | ◎ | ◎ | ◎ | ◎ | ◎ | ◎ | ◎ | ◎ | ◎ | ◎ | — | — | — | — | — |
| Adhesion | I | 100 | 100 | 100 | 100 | 100 | 100 | 100 | 100 | 100 | 100 | 100 | 100 | 100 | 100 | 100 | 100 |
| | II | 100 | 100 | 100 | 100 | 100 | 100 | 100 | 100 | 100 | 100 | 100 | 100 | 100 | 100 | 100 | 100 |
| | III | 100 | 100 | 100 | 100 | 100 | 100 | 100 | 100 | 100 | 100 | 100 | 100 | 100 | 100 | 100 | 100 |
| | IV | 100 | 100 | 100 | 100 | 100 | 100 | 100 | 100 | 100 | 100 | 100 | 100 | 100 | 100 | 100 | 100 |
| Chipping resistance | | ◎ | ◎ | ◎ | ◎ | ◎ | ◎ | ◎ | ◎ | ◎ | ◎ | ◎ | ◎ | ◎ | ◎ | ◎ | ◎ |
| Impact resistance | | ◎ | ◎ | ◎ | ◎ | ◎ | ◎ | ◎ | ◎ | ◎ | ◎ | ◎ | ◎ | ◎ | ◎ | ◎ | ◎ |
| Water resistance | | ◎ | ◎ | ◎ | ◎ | ◎ | ◎ | ◎ | ◎ | ◎ | ◎ | ◎ | ◎ | ◎ | ◎ | ◎ | ◎ |
| Gasoline resistance | | ◎ | ◎ | ◎ | ◎ | ◎ | ◎ | ◎ | ◎ | ◎ | ◎ | ◎ | ◎ | ◎ | ◎ | ◎ | ◎ |
| Heat resistance | | ◎ | ◎ | ◎ | ◎ | ◎ | ◎ | ◎ | ◎ | ◎ | ◎ | ◎ | ◎ | ◎ | ◎ | ◎ | ◎ |
| Moisture resistance | | ◎ | ◎ | ◎ | ◎ | ◎ | ◎ | ◎ | ◎ | ◎ | ◎ | ◎ | ◎ | ◎ | ◎ | ◎ | ◎ |
| Appearance | | ◎ | ◎ | ◎ | ◎ | ◎ | ◎ | ◎ | ◎ | ◎ | ◎ | ◎ | ◎ | ◎ | ◎ | ◎ | ◎ |
| volume inherent viscosity (ohms-cm) | | $10^3$ | $10^3$ | $10^3$ | $10^3$ | $10^3$ | $10^3$ | $10^3$ | $10^3$ | $10^{13}$ | $10^{13}$ | $10^{13}$ | $10^3$ | $10^3$ | $10^{13}$ | $10^{13}$ | $10^{13}$ |

| | | Example | | | | | Comparative Example | | | | | | |
|---|---|---|---|---|---|---|---|---|---|---|---|---|---|
| | | 28 | 29 | 30 | 31 | 32 | 6 | 7 | 8 | 9 | 10 | 11 | 12 | 13 |
| Object coated | | | | (c) | | | (a) | (b) | (c) | | | (a) | | |
| Coating of the coating composition (*1) | Designation | C | G | I | J | K | | — | | L | M | N | O | P |
| | Film thickness | | | 5μ | | | | — | | | | 5μ | | |
| | Drying | | | 120° C., 20 min. | | | | — | | | | 120° C., 20 min. | | |
| Sealer coating (*2) | Designation | | | — | | | (A) | | — | | | (A) | | |
| | Coating method | | | — | | | Air spray | | — | | | Electrostatic spray | | Air spray |
| Top coating (*3) | Designation | | | (A) | | | | Air spray | | Electrostatic spray (A) | | | | Air spray |
| | Coating method | | | Air spray | | | | Air spray | | | | Electrostatic spray | | Air spray |
| Properties of the coated film (*4) | | | | | | | | | | | | | | |
| Storage stability | | — | — | — | — | — | — | — | — | X | X | X | ○ | ○ |
| Adhesion | I | 100 | 100 | 100 | 100 | 100 | 40 | 100 | 100 | 100 | 100 | 100 | 100 | 100 |
| | II | 100 | 100 | 100 | 100 | 100 | 45 | 100 | 100 | 60 | 60 | 60 | 60 | 60 |
| | III | 100 | 100 | 100 | 100 | 100 | 30 | 90 | 90 | 40 | 40 | 40 | 40 | 40 |
| | IV | 100 | 100 | 100 | 100 | 100 | 30 | 90 | 90 | 30 | 30 | 30 | 30 | 30 |
| Chipping resistance | | ◎ | ◎ | ◎ | ◎ | ◎ | X | X | X | Δ | Δ | Δ | Δ | Δ |
| Impact resistance | | ◎ | ◎ | ◎ | ◎ | ◎ | X | X | X | Δ | Δ | Δ | Δ | Δ |
| Water resistance | | ◎ | ◎ | ◎ | ◎ | ◎ | ◎ | ◎ | ◎ | ◎ | ◎ | ◎ | ◎ | ◎ |
| Gasoline resistance | | ◎ | ◎ | ◎ | ◎ | ◎ | ◎ | ◎ | ◎ | ◎ | ◎ | ◎ | ◎ | ◎ |
| Heat resistance | | ◎ | ◎ | ◎ | ◎ | ◎ | ◎ | ◎ | ◎ | ◎ | ◎ | ◎ | ◎ | ◎ |
| Moisture resistance | | ◎ | ◎ | ◎ | ◎ | ◎ | ◎ | ◎ | ◎ | ◎ | ◎ | ◎ | ◎ | ◎ |
| Appearance | | ◎ | ◎ | ◎ | ◎ | ◎ | ◎ | ◎ | ◎ | ◎ | ◎ | ◎ | ◎ | ◎ |
| volume inherent viscosity (ohms-cm) | | $10^3$ | $10^3$ | $10^{13}$ | $10^{13}$ | $10^{13}$ | $10^{13}$ | $10^{13}$ | $10^{13}$ | $10^4$ | $10^5$ | $10^5$ | $10^{13}$ | $10^{13}$ |

Notes to Table 4
(*1): Film thickness denotes the thickness in microns of a coated film after drying at room temperature.
(*2): Method of sealer coating
The sealer was applied by electrostatic coating or air spray coating to a dry thickness of 30 microns, and then baked at 140° C. for 20 minutes.
(*3): Method of top coating
The top coating paint was applied by electrostatic coating or air-spray coating to a dry thickness of 35 microns, and baked at 140° C. for 20 minutes.
(*4): Testing methods The coating composition was used after standing for 48 hours at room temperature from the blending of its entire components.

Storage stability

Each of coating compositions A to K of this invention and coating compositions L to P for comparison was filled in a closed container and stored at 30° C. for 10 days. Thereafter, the state of the coating composition was examined. The result was evaluated by the following ratings.

◎: No change at all.
Δ: Slight thickening and pigment flocculation was observed.
X: Thickening and pigment flocculation were remarkable.

Adhesion

I: One hundred square sections having a size of 1×1 mm and reaching the substrate were provided by cross cutting with a sharp blade on a dry coated film of the coating composition on the substrate. Then, an adhesive tape was applied to the cut coated film and peeled off abruptly. The number of the remaining square sections was examined.

II: A sealer or a top coating paint was coated on the coated film used in I above, dried and cured. Thereafter, it was subjected to the same crosscut adhesion test as in I above.

III: The coated sample used in I above was subjected to the crosscut adhesion test after it was submitted to the moisture resistance test described hereinbelow.

IV: The coated sample used in III was treated as in III.

Chipping resistance (1) Testing instrument: Q-G-R Gravelometer (a product of Q Panel Company).

(2) Gravel to be blown against the sample: crushed stones with a diameter of about 15 to 20 mm.

(3) Volume of the gravel blown: about 500 ml (4) Air pressure for blowing: about 6 kg/cm$^2$ (5) Temperature at the time of testing: about 20° C.

The test sample was mounted on a holder, and about 500 ml of the crushed stones were impinged against the sample under a blowing air pressure of about 6 kg/cm$^2$. Thereafter, the state of its coated surface was evaluated as follows:

◉: Slight injury as a result of impact was noted in part of the top coat (good)

Δ: Much injury owing to impact was noted in the top and sealer coats (slightly poor)

X: Most of the top and sealer coats were peeled owing to impact (poor).

Impact strength

In accordance with JIS K-5400-1979 6.13. 3B method, the test was carried out in an atmosphere kept at −20° C. A weight of 500 g was let fall from a height of 50 cm, and the injury of the coated film was examined. The results was evaluated by the following ratings.

◉: No change at all.

Δ: Slight occurrence of cracking and peeling.

X: Much occurrence of cracking and peeling.

Water resistance

The state of the coated surface was examined after immersion for 10 days in water at 40° C.

◉: No change.

Δ: Slight occurrence of blisters.

X: Much occurrence of blisters and peeling.

Gasoline resistance

Gasoline (about 0.3 to 0.5 ml) was added dropwise onto the surface of the coated film. After standing for 4 hours in a laboratory at 20° C., it was wiped off with a cloth. Immediately then, the coated film was examined for a loss of gloss, stain, discoloration, softening, peeling and cracking. The results were evaluated by the following ratings.

◉: No change.

Δ: Slight occurrence of blisters and swelling.

X: Much occurrence of blisters and peeling.

Heat resistance

The coated plate was left to stand for 500 hours in a constant temperature vessel at 90° C., and then at room temperature for 24 hours. Then, the appearance of the coated film and changes in the coated surface owing to heat, such as discoloration and a loss of gloss, were examined. The result was evaluated by the following ratings.

◉: No change.

Δ: Slight occurrence of discoloration and a loss of gloss.

X: Much occurrence of discoloration and a loss of gloss.

Moisture resistance

A closed box whose temperature and humidity were adjustable was used. The coated plate was placed horizontally in the closed box adjusted to a temperature of 50±1° C. and a relative humidity of at least 98%, and after 240 hours, the state of the coated surface was examined.

◉: No change at all.

Δ: Slight occurrence of blisters

X: Marked occurrence of blisters and peeling.

Appearance

The surface of the coated plate was visually examined with normal eyes at a position about 50 cm apart from the surface under a daylight fluorescent lamp with an illumination of at least 500 luxes indoors. The result was evaluated by the following ratings.

◉: Good

Δ: Slightly good

X: Dents and nibs occurred.

Volume inherent resistivity

Two cuts having a length of 3 cm and spaced from each other by 2 cm were provided on the coated test sample so that they reached the substrate. An air drying electrically conductive paint (Dotite, made by Fujikura Chemical Co., Ltd.) was cast into the cuts. The samples was left to stand for one day, and the volume inherent resistivity (ohms-cm) of the coated film was measured by using the two cuts as an electrode.

We claim:

1. A coating composition obtained by dissolving or dispersing in an organic solvent a composition comprising as a main film-forming component, a modified polyolefin composed of an adduct of a monoepoxy compound with a graft polyolefin selected from (a) graft polymers of polyolefins, as a trunk, with maleic acid and (b) ring-opened products obtained by half-esterifying with monohydroxy compounds, graft polymers of polyolefins, as a trunk, with maleic anhydride.

2. The composition of claim 1 wherein the polyolefin as a trunk has a number average molecular weight of 10,000 to 500,000 and a glass transition temperature of not more than 0° C.

3. The composition of claim 1 wherein the polyolefin is an ethylene/propylene copolymer composed of 10 to 60 mole% of ethylene units and 90 to 40 mole% of propylene units.

4. The composition of claim 3 wherein the polyolefin is an ethylene/propylene copolymer composed of 25 to 50 mole% of ethylene units and 75 to 50 mole% of propylene units.

5. The composition of claim 3 wherein the ethylene/propylene copolymer has a glass transition point of not more than −10° C.

6. The composition of claim 1 wherein the polyolefin contains 1 to 25% by weight of maleic acid or its anhydride based on the weight of the trunk olefinic polymer.

7. The composition of claim 6 wherein the amount of maleic acid or its anhydride is 5 to 20% by weight based on the trunk olefinic polymer.

8. The composition of claim 1 wherein the monohydroxy compound is methanol or ethanol.

9. The composition of claim 1 wherein the monoepoxy compound is selected from compounds of the formula

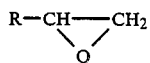

in which R represents a $C_6$-$C_{30}$ linear alkyl group and glycidyl esters of tertiary fatty acid.

10. The composition of claim 1 wherein the adduct contains 1 to 50% by weight of the monoepoxy compound.

11. The composition of claim 1 wherein the adduct contains 2 to 30% by weight of the monoepoxy compound.

12. The composition of claim 1 which comprises an organic solvent selected from aromatic hydrocarbons, aliphatic hydrocarbons and chlorinated hydrocarbons.

13. The composition of claim 1 which further comprises not more than 100 parts by weight, per 100 parts by weight of the modified olefinic resin, of a pigment.

14. A method of coating a plastic material, which comprises coating the plastic material with the coating composition of claim 1 as a primer, then as required, coating a sealer on the primer, and then coating a top coating paint.

15. An article coated with the coating composition of claim 1.

* * * * *